(12) United States Patent
Werth et al.

(10) Patent No.: US 8,947,603 B2
(45) Date of Patent: Feb. 3, 2015

(54) ROOF SYSTEM FOR A VEHICLE

(75) Inventors: Jennifer A. Werth, Holland, MI (US);
Eric S. Deuel, Allendale, MI (US); Arne Dassen, Holland, MI (US); L. Robert Hamelink, Hamilton, MI (US)

(73) Assignee: Johnson Controls Technology Company, Holland, MI (US)

( * ) Notice: Subject to any disclaimer, the term of this patent is extended or adjusted under 35 U.S.C. 154(b) by 1395 days.

(21) Appl. No.: 12/522,133

(22) PCT Filed: Jan. 3, 2008

(86) PCT No.: PCT/US2008/050135
§ 371 (c)(1),
(2), (4) Date: Oct. 7, 2011

(87) PCT Pub. No.: WO2008/086109
PCT Pub. Date: Jul. 17, 2008

(65) Prior Publication Data
US 2012/0140126 A1    Jun. 7, 2012

Related U.S. Application Data

(60) Provisional application No. 60/878,715, filed on Jan. 4, 2007.

(51) Int. Cl.
*H04N 5/64* (2006.01)
*B60R 11/02* (2006.01)
*B60R 11/00* (2006.01)

(52) U.S. Cl.
CPC ......... *B60R 11/0235* (2013.01); *B60R 11/0264* (2013.01); *B60R 2011/0028* (2013.01); *B60R 2011/0085* (2013.01); *B60R 2011/0276* (2013.01)
USPC ........................................ 348/837

(58) Field of Classification Search
USPC .............................. 348/837; 296/39.2, 216.01
See application file for complete search history.

(56) References Cited

U.S. PATENT DOCUMENTS 4,413,735 A * 11/1983 Little ............................ 206/523
4,467,579 A *  8/1984 Weinar .......................... 52/281

(Continued)

FOREIGN PATENT DOCUMENTS

DE         102 26 453 C1    10/2003
EP         1 245 449 A2     10/2002

OTHER PUBLICATIONS

PCT International Preliminary Report on Patentability corresponding to PCT/US2008/050135, dated Jul. 7, 2009, 1 page.

(Continued)

*Primary Examiner* — Sath V Perungavoor
*Assistant Examiner* — Peter D Le
(74) *Attorney, Agent, or Firm* — Foley & Lardner LLP

(57) ABSTRACT

A roof assembly for a vehicle is disclosed and includes a display device supported at the roof assembly. The display device is selectively movable between a use position and a stowed position. The roof assembly also includes a user interface associated with the display device, a light source supported at the roof assembly that is configured to illuminate the user interface and a switch for activating the light source when the display device is selectively moved from the stowed position. Another roof assembly for a vehicle is disclosed that includes a vehicle component that is at least partially supported at a transparent roof panel. A method of manufacturing a perimeter trim member for a vehicle is disclosed and includes designing the perimeter trim member as a plurality of sections and molding the plurality of sections as a single sheet of material.

21 Claims, 13 Drawing Sheets

(56) References Cited

U.S. PATENT DOCUMENTS

| | | | | |
|---|---|---|---|---|
| 4,513,981 | A * | 4/1985 | DeGraaff et al. | 280/828 |
| 5,033,635 | A * | 7/1991 | Philips | 220/359.4 |
| 5,182,065 | A * | 1/1993 | Piotrowski et al. | 264/153 |
| 5,221,119 | A * | 6/1993 | Emery | 296/39.2 |
| 5,314,226 | A * | 5/1994 | Tovar | 296/97.7 |
| 5,374,118 | A * | 12/1994 | Kruck et al. | 312/407 |
| 5,580,122 | A * | 12/1996 | Muehlhausen | 296/193.02 |
| 5,589,121 | A * | 12/1996 | Inagaki et al. | 264/132 |
| 5,868,455 | A * | 2/1999 | Springer et al. | 296/146.1 |
| 6,339,455 | B1 * | 1/2002 | Allan et al. | 348/837 |
| 6,390,648 | B1 * | 5/2002 | Privas et al. | 362/276 |
| 6,409,242 | B1 * | 6/2002 | Chang | 296/37.7 |
| 2003/0111871 | A1 * | 6/2003 | De Gaillard | 296/216.01 |
| 2005/0045682 | A1 * | 3/2005 | Tarrant et al. | 224/498 |
| 2005/0057053 | A1 * | 3/2005 | Evans et al. | 293/133 |
| 2005/0090946 | A1 * | 4/2005 | Pickering et al. | 701/2 |
| 2005/0140167 | A1 * | 6/2005 | Jaggi | 296/146.7 |
| 2006/0055833 | A1 * | 3/2006 | Lee et al. | 348/837 |
| 2007/0281133 | A1 * | 12/2007 | Smith et al. | 428/161 |
| 2008/0199648 | A1 * | 8/2008 | Atkinson | 428/50 |
| 2008/0213141 | A1 * | 9/2008 | Pinchot | 422/193 |
| 2013/0069506 | A1 * | 3/2013 | Bennett et al. | 312/228 |

OTHER PUBLICATIONS

PCT Written Opinion corresponding to PCT/US2008/050135, dated Jul. 7, 2009, 8 pages.

International Search Report for corresponding PCT Application No. PCT/US2008/050135, dated May 19, 2008, 2 pages.

* cited by examiner

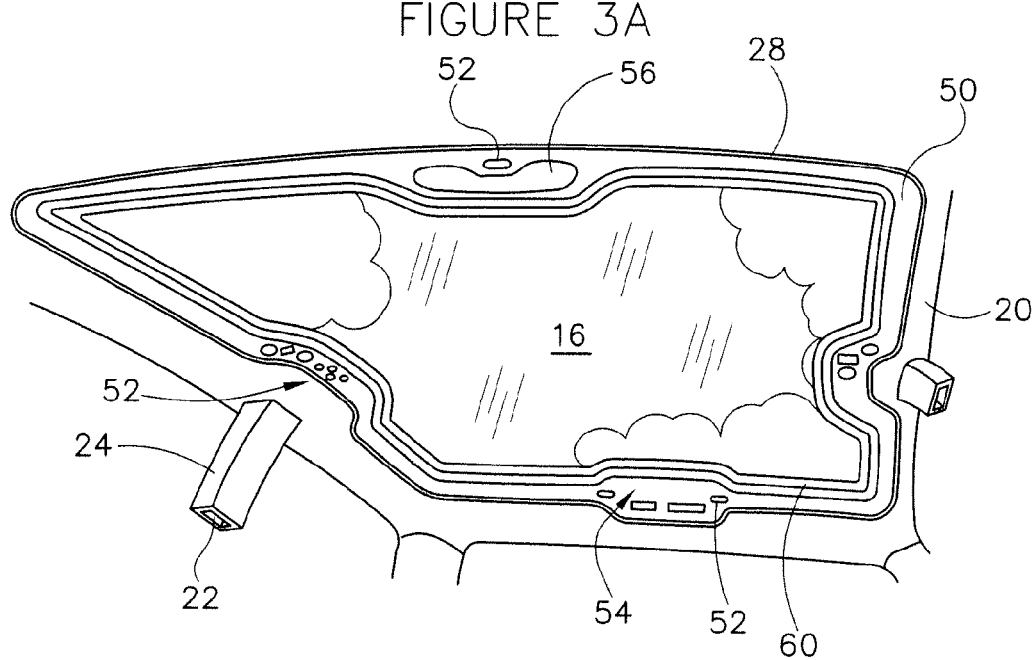
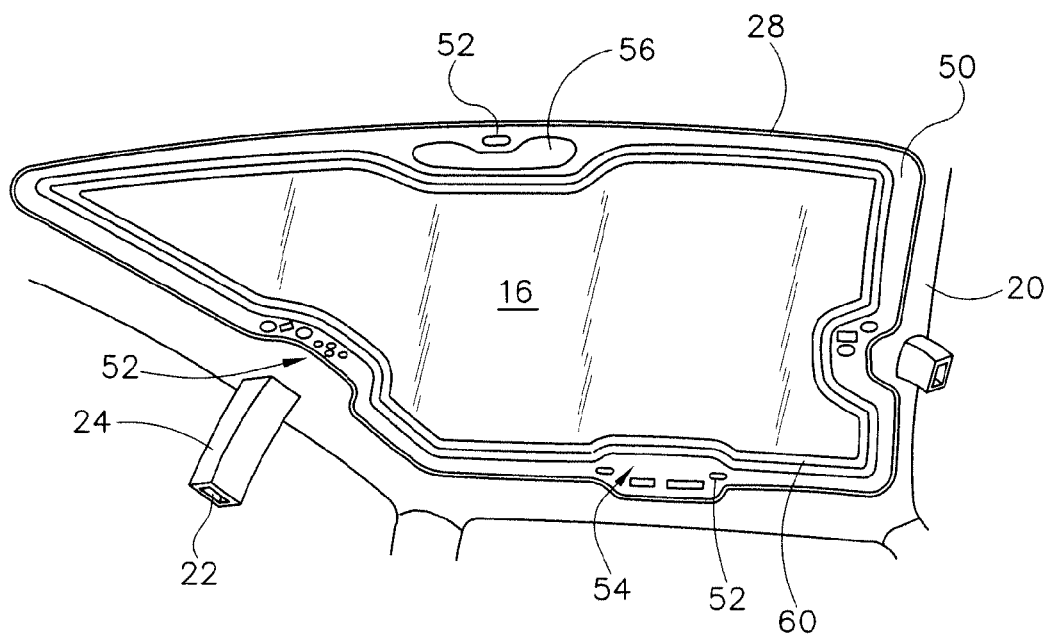

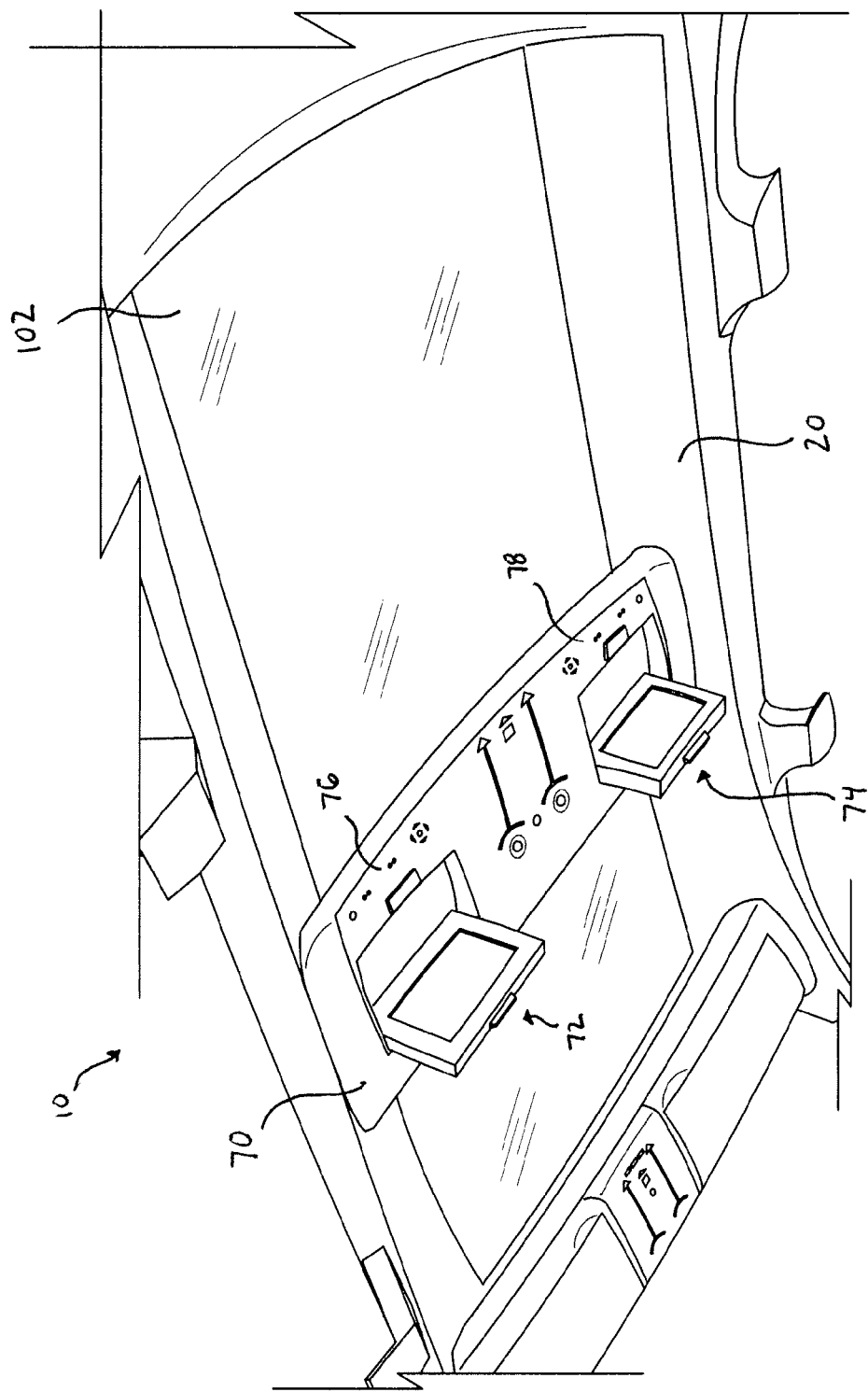

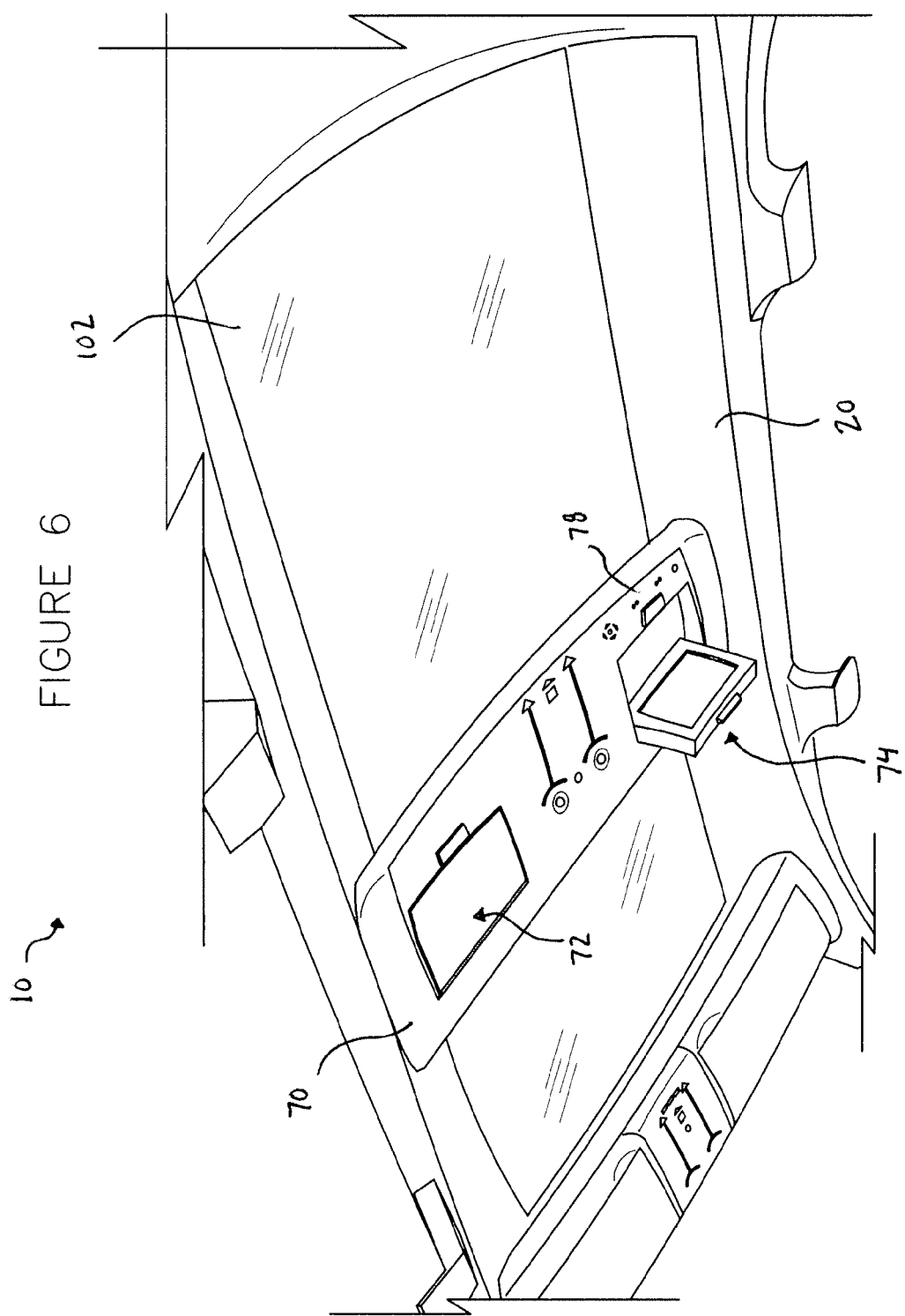

ROOF SYSTEM FOR A VEHICLE

CROSS-REFERENCE TO RELATED PATENT APPLICATIONS

This Application is a National Stage of PCT/US2008/050135, filed Jan. 3, 2008, which claims the benefit and priority to U.S. Provisional Application Ser. No. 60/878,715, filed Jan. 4, 2007. The foregoing applications are incorporated by reference herein in their entirety.

BACKGROUND

The present disclosure relates generally to a roof system for a vehicle. More specifically, the present disclosure relates to a roof system configured to support a vehicle component (e.g., a display device, etc.). The present disclosure also relates to a method of manufacturing a perimeter trim member of the roof system.

Roof panels for use in vehicles are generally known. For example, conventional roof systems may include a transparent panel or window along the roof of the vehicle to permit occupants within the vehicle to "see through" the roof and view overhead external surroundings. The transparent panels or windows are generally surrounded by a perimeter trim member. Such perimeter trim members must have an opening configured to receive the transparent panel or window, and accordingly, may result in a large amount of scrap or waste material when formed. Video display panels mounted to a roof system and configured to "fold down" for viewing by occupants of the vehicle are also generally known. However, video display panels are typically only used with roof systems that do not include a transparent panel or window, and if they are, the display panels are spaced away from the transparent panel or window.

It would be desirable to provide a roof system having a generally transparent panel (e.g. glass panel, etc.) configured for viewing of the external surroundings by occupants of the vehicle. It would also be desirable to provide a vehicle component (e.g., a display device to display images (e.g. video images, etc.) for viewing by the occupants of the vehicle, etc.) supported at the roof system and near the generally transparent panel. It would further be desirable to provide a user interface for the vehicle component that is conveniently positioned and aesthetically pleasing for the user. It would further be desirable to provide a method of manufacturing a perimeter trim member that is capable of reducing the amount of scrap or waste material. Such systems and method would provide an improved roof system that may be more functional for a user, more user friendly for the user and/or more cost effective to manufacturer and/or maintain. However, the problems posed by these systems and method are particularly complicated because they exist within the complexity of the overall design of a vehicle. For example, the sizing constraints of the vehicle, the positioning components within the vehicle, the various demands of consumers, etc. Accordingly, the selection of a solution may result in unforeseen complications, cost increases, manufacturing efficiency losses, expensive part configurations, etc.

SUMMARY

According to an exemplary embodiment, a roof assembly for a vehicle includes a display device supported at the roof assembly. The display device is selectively movable between a use position and a stowed position. The roof assembly also includes a user interface associated with the display device, a light source supported at the roof assembly that is configured to illuminate the user interface and a switch for activating the light source when the display device is selectively moved from the stowed position.

According to another exemplary embodiment, a roof assembly for a vehicle is disclosed and includes a panel assembly including a transparent roof panel, a perimeter trim member substantially surrounding the panel assembly, a vehicle component at least partially supported at the transparent roof panel, a support member mounted to the transparent roof panel for at least partially supporting the vehicle component and an adhesive disposed between the support member and the transparent roof panel for securing the support member to the transparent roof panel.

According to another exemplary embodiment, a method of manufacturing a perimeter trim member for a vehicle is disclosed and includes designing the perimeter trim member as a plurality of sections, molding the plurality of sections as a single sheet of material, separating the plurality of sections from the single sheet and assembling the plurality of sections to form the perimeter trim member.

BRIEF DESCRIPTION OF THE DRAWINGS

FIGS. 3A-3D are schematic illustrations of a roof system having various display images provided thereon.

FIG. 5 is a schematic illustration of a perspective view of a roof system according to another exemplary embodiment.

FIG. 6 is another schematic illustration of a perspective view of the roof system shown in FIG. 5.

DETAILED DESCRIPTION

Figure 1:
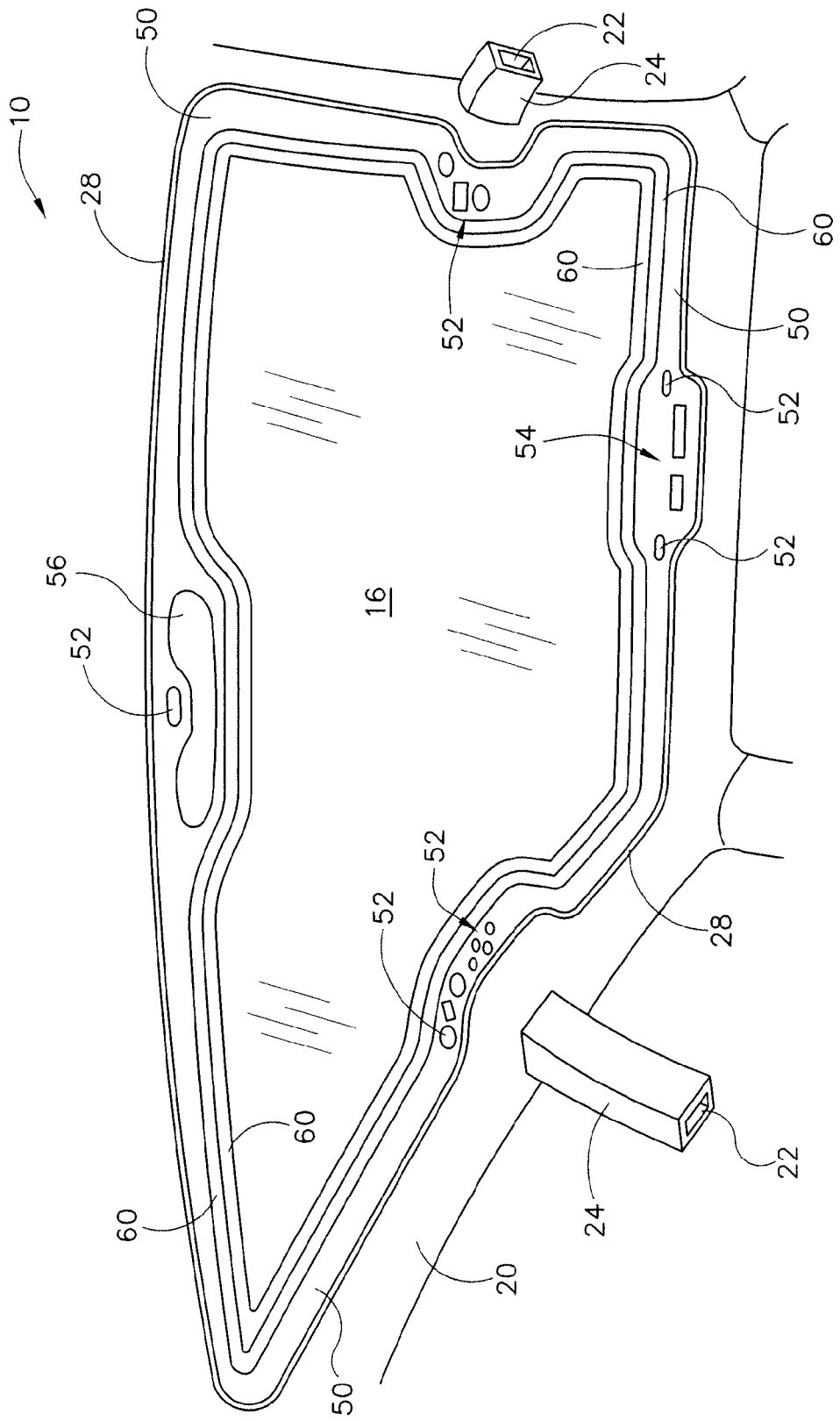
FIG. 1 is a schematic illustration of a perspective view of a roof system according to an exemplary embodiment.

The FIGURES illustrate an exemplary embodiment of an assembly of components shown as a vista roof system for use in a vehicle (e.g., automobiles such as cars, minivans, trucks, buses, and the like; airplanes, boats, etc.). Such vista roof systems may be provided in a wide variety of sizes, shapes, materials and configurations (i.e. one or more panels, etc.) according to various exemplary embodiments. The components shown and described for the vista roof system may also be used to permit see-through viewing and image display for other windows or transparent panels within a vehicle. Accordingly all such vista roof systems are intended to be within the scope of the subject matter described herein.

Referring to FIGS. 1 through 4B, the vista roof system 10 is shown according to an exemplary embodiment and is intended for use in a first mode (e.g. vista mode, etc.—see for example FIG. 3A where the roof is substantially transparent) to provide a roof panel assembly 12 that permits occupants of a vehicle to see-through the roof for viewing external surroundings. The vista roof system 10 is also intended for use in a second mode (e.g. privacy mode, etc.—see FIG. 3B) to provide a roof panel assembly 12 that is generally opaque and does not permit (or substantially limits) viewing (e.g. prevents or restricts outsiders from looking in, blocks or reflects sunlight, etc.). The vista roof system 10 is also intended for use in a third mode (e.g. display mode, etc.—see FIGS. 3C-3D) for displaying objects or images on the interior roof of the vehicle for viewing by occupants of the vehicle (e.g. when viewing the external surroundings in the vista mode is unavailable, undesirable, not preferred, etc.).

The roof panel assembly 12 of the vista roof system 10 is shown having a shape and size intended to cover a majority of the roof area of a vehicle, and is substantially surrounded by a perimeter trim member(s) 20 (e.g. frame, support, etc.) that provides structural and functional support to the roof panel assembly 12, and acts as a trim piece or bezel for "trimming out" the overhead area of the vehicle. The perimeter trim member 20 may be provided as a single piece, or as multiple pieces configured for interconnection, or as extendable/retractable (e.g. telescoping, etc.) members configured for use with roof panels of varying sizes (e.g. for multiple vehicle programs, etc.). The perimeter trim member 20 may also be configured for retaining other overhead components (e.g. consoles, instruments, visors, grab-handles, communication devices (e.g. speakers, microphones, switches, etc.), wiring and electrical components, illumination devices, head impact countermeasure (HIC) devices, etc.—not shown). According to alternative embodiments, the panels of the roof panel assembly 12 may be provided in a wide variety of sizes and shapes, and for various types of vehicles and vehicle programs. For example, the panels of the vista roof system may be generally "fixed" as shown in the FIGURES, but may also be movable, such as in the form of a sunroof or moon-roof window that is liftable, slidable, tiltable, etc., or may be removable (e.g. for service, repair, etc.). In addition, the panel assembly may be provided as a single panel or as multiple panels.

The perimeter trim member 20 is also shown to include a ventilation system comprising air supply passages 22 (e.g. ducts, etc.) integrated within side pillars 24 of the vehicle body (shown for example as two ducts within a hollow "B" pillar in FIG. 1) that communicate with an airspace shown as a cavity or plenum 26 (see FIG. 2) behind the perimeter trim member 20 for directing a flow of air through an opening 28 (e.g. slot, gap, slit, vent, etc.) formed in the perimeter trim member 20 around the all, or a portion, of the perimeter of the roof panel assembly 12 so that the vehicle cabin may be ventilated by directing or driving a flow of air with a fan (not shown) through passages 22 and vent 28. The airflow may also be generated by any suitable arrangement for creating a pressure differential (e.g. positive or negative) between the vehicle cabin and exterior environment. According to an alternative embodiment, the air may be drawn through the vent in a reverse direction to remove air from the vehicle cabin (such as when the cabin is at an elevated temperature after being parked in sunlight, etc.) by operating the fan (or generating a pressure differential) in a reverse direction. According to a further alternative embodiment, a supplemental fan may be disposed within or proximate the plenum and arranged to communicate through a roof vent with the external environment, so that a user may actuate the supplemental fan through suitable controls (such as touch-activated controls integrated with the roof panel as shown for example in FIG. 1), to draw air from the external environment into the cabin (with the supplemental fan operating in one direction) or to discharge air from the vehicle cabin to the external environment (with the supplemental fan operating in the reverse direction). According to a further alternative embodiment, the vent may be formed by a gap arranged between two partially overlapping segments of a perimeter trim member assembly, so that a peripheral vent is formed between two vertically "stacked" portions of a perimeter trim assembly.

Figure 2:
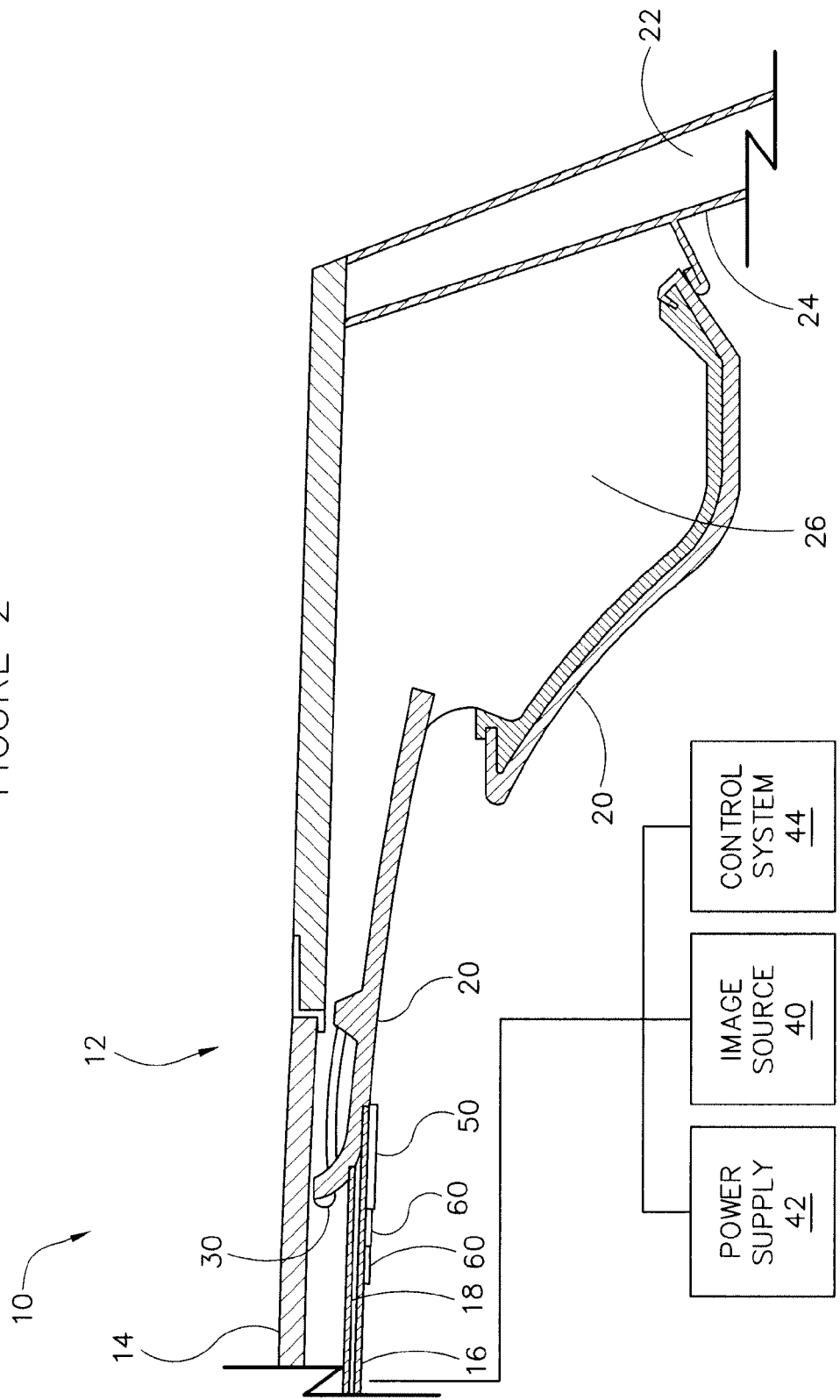
FIG. 2 is a schematic illustration of a partial cross sectional view of a roof system according to an exemplary embodiment.
Figure 3C:
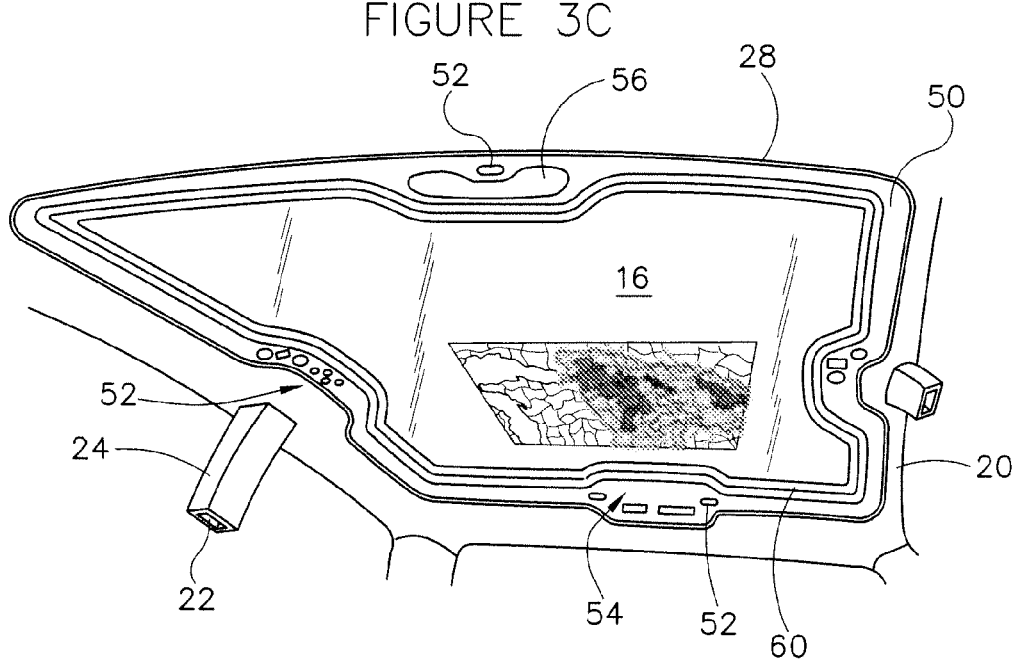
Figure 3D:
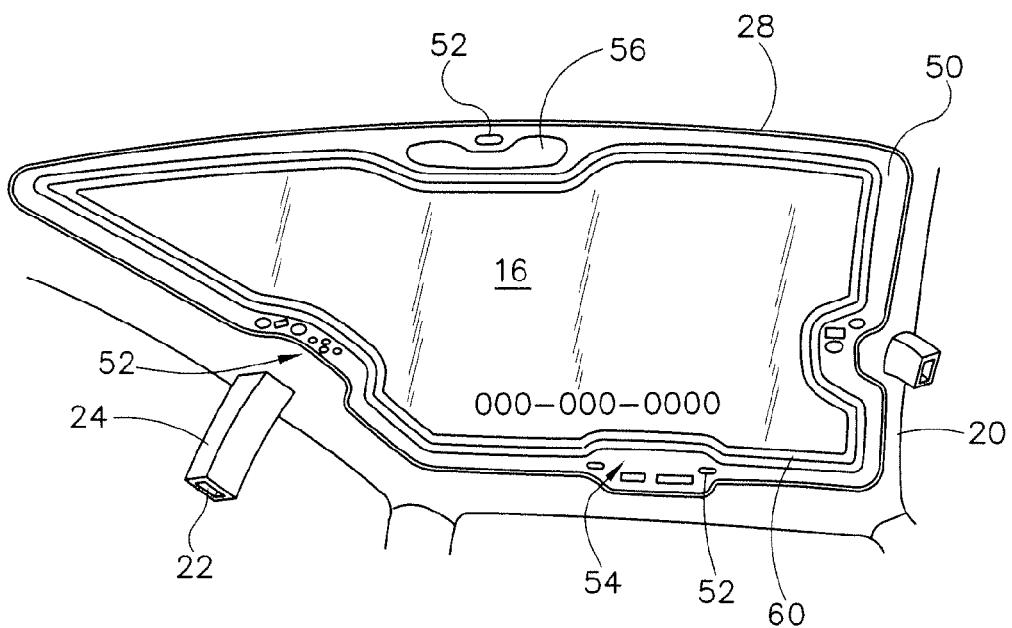

Referring to FIG. 2, the arrangement of the panels of the roof panel assembly 12 are shown according to an exemplary embodiment. The panels of the roof system are shown "layered" in a generally "stacked" arrangement where the transparent roof panel 14 is shown as an external panel, the transparent display panel is shown as an internal panel 16, and the privacy panel 18 is shown positioned between the roof panel 14 and the display panel 16. The edges of the panels may be provided with a suitable seal or gasket intended to prevent entry of moisture or other contaminants within the space between the panels. According to the illustrated embodiment, in the vista mode, the privacy panel 18 is transparent and the display panel is transparent 16 (i.e. not displaying an image) so that an occupant of the vehicle may see-through the layered panels and view surroundings (or other objects) external to the vehicle. In the privacy mode, the privacy panel 18 becomes substantially opaque (and in a desired color) to "block" or prevent viewing through the roof of the vehicle (e.g. to prevent sunlight exposure, or to prevent visual access by others outside the vehicle, etc.). According to one embodiment, the privacy panel 18 may include electrochromic (EC) glass technology (such as, for example, EC technology used to darken rear view mirrors in vehicles). According to another embodiment, the privacy panel 18 may include a translucent white EC material in large format (e.g. such as, for example, EC technology used to self-shade building windows). The privacy panel 18 may be configured for use with either light or dark opaqueness depending on the intended application and images to be displayed, and/or the color and effect of the background on the images to be displayed. According to alternative embodiments, any suitable technology may be used for changing the privacy panel from a transparent condition to an opaque condition, or by further way of example, for changing the privacy panel from having a reflective finish to a non-reflective finish. In the display mode, the privacy panel 18 remains opaque and serves as a contrasting "backscreen" for the images displayed on the transparent display panel 16.

As shown in FIG. 2, for embodiments that use a backlighted display, an illumination source 30 may be provided between the roof panel 14 and the privacy panel 18 and attached to, or embedded in, the perimeter trim member 20 for providing a source of illumination along a back side of the privacy panel 18 (when viewed from the vehicle interior). The illumination source 30 may be provided by light emitting diodes (e.g. white LEDs and/or colored LEDs that may be mounted along an edge of the panel or light-piped to the panel), incandescent bulbs, or other suitable illumination source. According to an alternative embodiment, the roof system may be provided without a privacy panel. For example, the roof system may be provided with a single panel that is transparent in one mode and may be activatable to an opaque condition in a second mode for privacy. The single panel may also be capable of displaying images directly on a surface of the panel for viewing by a user.

According to one embodiment, the roof panel 14 is a substantially transparent member made from a suitable material (e.g. glass, etc.) and having a suitable thickness to provide the desired structural support for the roof system 10 on the vehicle. The privacy panel 18 is shown positioned interior and adjacent to the roof panel 14 and may be separated by a gap having a sufficient size intended to provide an area for backlighting the privacy panel 18 when operating in the display mode. The privacy panel 18 is made of a suitable material (e.g. glass, etc.) having characteristics that are capable of changing from a substantially transparent condition (for use in the vista mode) and an opaque condition (e.g. white, off-white, black, etc.) for use in preventing or blocking visual access through the roof during the privacy mode and to act as a back-screen to provide contrast (and/or backlighting) for the images displayed on the display panel 16 during the display mode. The display panel 16 is formed from a relatively thin, transparent substrate material (e.g. plastic, polymer, glass, etc.) having a display formed from suitable devices or technology such as thin-film transistors (TFT), or organic light emitting diodes (OLED), electrophoretics, liquid-crystal technology, or any other suitable technology or device (now known or future-developed) intended to display an image on a substantially transparent surface.

Referring further to FIG. 2, during the display mode, an occupant of the vehicle may select (e.g. by actuating certain designated touch-activated switches) various images from an image source 40 (image generator, etc.) for viewing on the display panel 16. The image generator 40 is preferably a computer device configured to communicate (e.g. transmit, upload, link, etc.) the image data to the display panel 16. The image data may be communicated via a suitable wire/cable and connector system (e.g. including USB ports, etc.—which may be routed along a back or "C" side of the perimeter trim member 20) or may be communicated in a wireless manner (e.g. infrared, RF, Bluetooth, etc.). The images may be generally "still" images (as shown for example in FIG. 3D), such as designs, abstract images, logos, insignias, pictures, photographs, murals, business information, operations or owner's manual information, or any of a wide variety of other still images. The images may also be "dynamic" images (as intended to be shown in the graphic representation of a radar weather map in FIG. 3C), such as movie images, video clips, television images, weather maps, driving directions, interactive road maps, etc. The image generator 40 may be any suitable device for communicating data for display of an image on the display panel 16, such as a DVD player, MP3 player, iPod®, TiVo®, satellite receiver, PhatNoise® module, telephone, portable computing device, personal data assistant (PDA), etc. and may communicate in a hard-wired or wireless manner with the display panel. For example, the image generator 40 may be configured to communicate with a telephone and send data to the display panel for display the telephone number (and/or other data) related to an incoming telephone call. The display panel 16 may also be provided with data memory for storage of various images that may be directly selected for viewing by an occupant of the vehicle (e.g. from a console 70 on the roof system (see FIGS. 4A-4B), or a remote control device, etc.).

The roof system 10 also includes suitable wiring systems of a conventional type for providing power from a power source 42 or supply (e.g. vehicle battery system, etc.) to the display panel and the illumination devices, which may be routed along the C side of the perimeter trim member 20, or within the perimeter trim member(s) 20. The display panel 16 may also be configured to interface with the lighting system of an instrument panel of the vehicle, so that adjustment of the color or brightness of the instrument panel display will also result in a corresponding change in the color theme or brightness of the display panel.

According to one embodiment, the roof system 10 include a control system 44 intended to control operation of the roof system in the various modes. For example, the control system 44 may include suitable switches (shown as touch-activated switches 52 shown schematically in FIG. 1), wiring, connectors and electronics of a conventional type (or future-developed type) for turning the illumination device 30 on and off, and for changing the privacy panel 18 between the transparent condition and the opaque condition, and for providing power to the display panel 16, and for uploading data for display of images on the display panel 16, and for communicating with other components of the vehicle (e.g. instrument clusters, instrument panel, telephones, permanent or handheld GPS navigation devices, for changing the color of the ambient lighting devices 60 as the color of the displayed image changes, etc.). The control system 44 is intended to include a suitable interface through the touch-activated switches for operation by an occupant of the vehicle. However, the control system may also be activated by any other suitable interface, such as a control panel mounted within the vehicle, hand-held remote control device, voice-activated control device, or field effect (capacitive) sensing, etc.

Referring further to FIGS. 1 and 2, one panel of the roof panel assembly (shown for example as the transparent display panel 16, but may also be a single transparent panel for applications without a display or privacy function, or systems having a single panel) also includes a user-interface segment 50 on the transparent panel 16, shown for example as an opaque border (e.g. black, or other color intended to coordinate with an interior trim color scheme, etc.) which includes various touch-activated switches 52 (such as capacitance switches, etc.) that are provided for control of equipment such as the ventilation system, lighting, operation of the vista roof panel system, etc.), and various information displays 54 for communicating information to the user, and other objects such as lights 56. The cross car console ("targa console") has similar features, such as capacitive switching, hidden indicators until activated (backlit) by a video screen deployment or other suitable method. See FIGS. 5A, 5B and 6 and discussed further below. According to a preferred embodiment, the user-interface border 50 is provided as a black colored border with a gloss finish, however, any suitable finish may be used (e.g. matte, textured, etc.). User interface border 50 may also include a wide variety of other components integrated therein, such as "hidden" instrumentation and/or indicators (e.g. a compass, multi-function computer and display, task lighting, HVAC controls, temperature displays, back-lit icon-graphics, warning lights/indicators, remote actuation devices such as Homelink®, tire pressure monitor readouts, etc.). According to one embodiment, the functional elements built into or integrated with the border may remain "hidden" until activated (e.g. by activation by a user through touch, voice, etc.), or certain functional elements may be visible whenever the vehicle is occupied (such as through motion sensors in the vehicle cabin, activation of the vehicle ignition switch, etc.).

Referring further to FIGS. 1 and 2, ambient lighting devices (shown schematically as peripheral bands or "light frames" 60) are intended to provide "soft" or low-intensity lighting are shown "layered" or otherwise integrated with transparent panel 16 and may be arranged internally or externally in relation to the user-interface border 50. The ambient light devices or bands 60 may be provided with any particular color or combination of colors and may be equipped with illumination sources such as LEDs that are located behind a cover having a light-dispersing coating or composition, or other suitable arrangement, such as light-pipe technology. The color of the light provided by the illumination source may be constant, or may be variable. For example, the color may be changed or the intensity varied by manual selection from a user, or the color may be automatically changed to coordinate/compliment the color of images generated by the image generator 40 and displayed on the display panel. The illumination sources for the lighting bands 60 may be controlled by the touch-activated switches 52 (or other suitable control devices) and may be arranged for on-off operation, or for variable-dimming operation. The ambient lighting bands 60 are shown to surround the perimeter of a roof panel, but may also be arranged to "accent" or "outline" a certain region on the roof panel or segregate one portion of the roof panel from another portion of the roof panel, or provided as "spots" or "islands" to provide a desired ambient lighting arrangement.

Figure 4A:
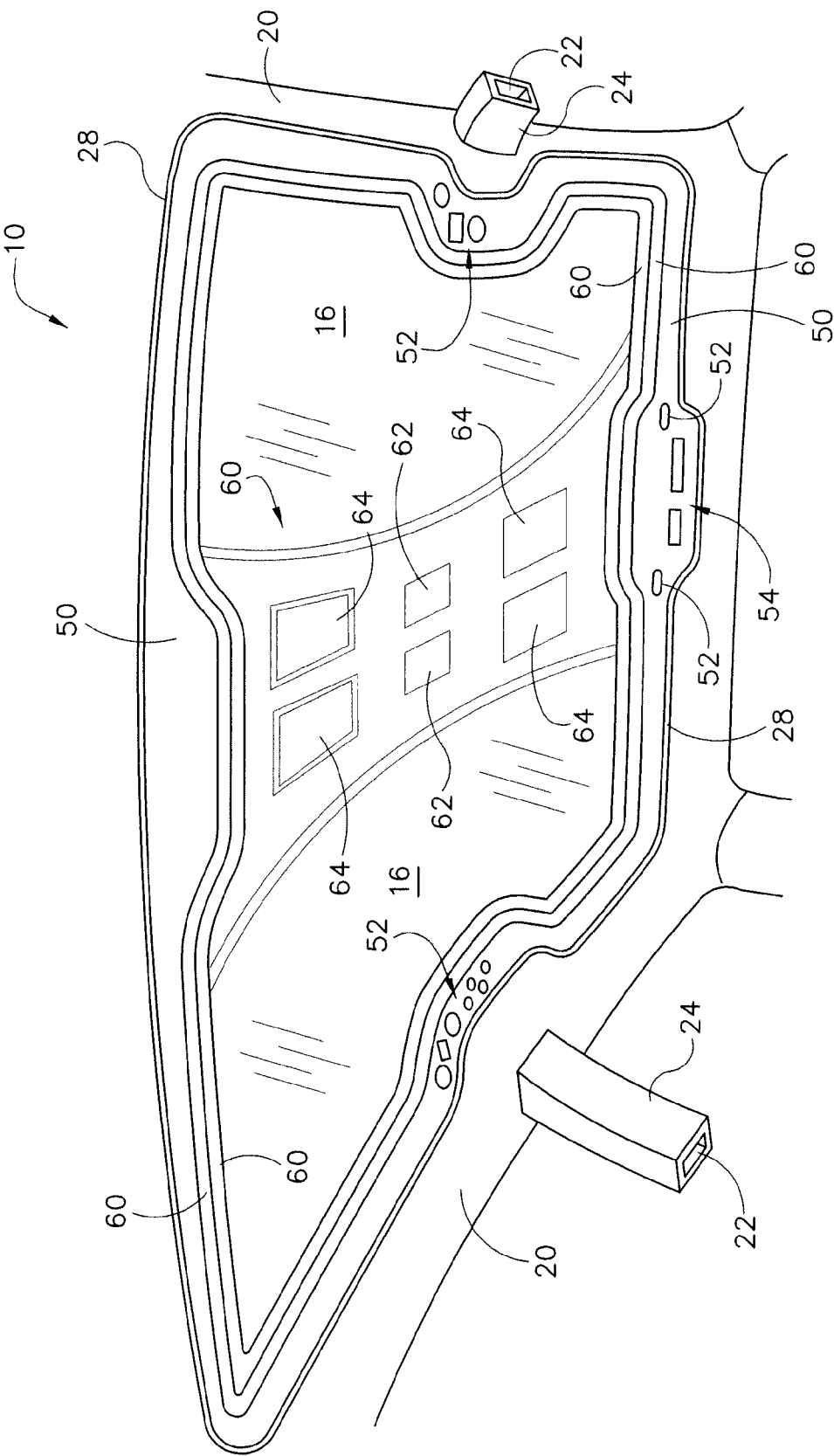
FIG. 4A is a schematic illustration of a roof system having a console with a lighting and media display section integrated with a translucent display panel according to an exemplary embodiment.
Figure 4B:
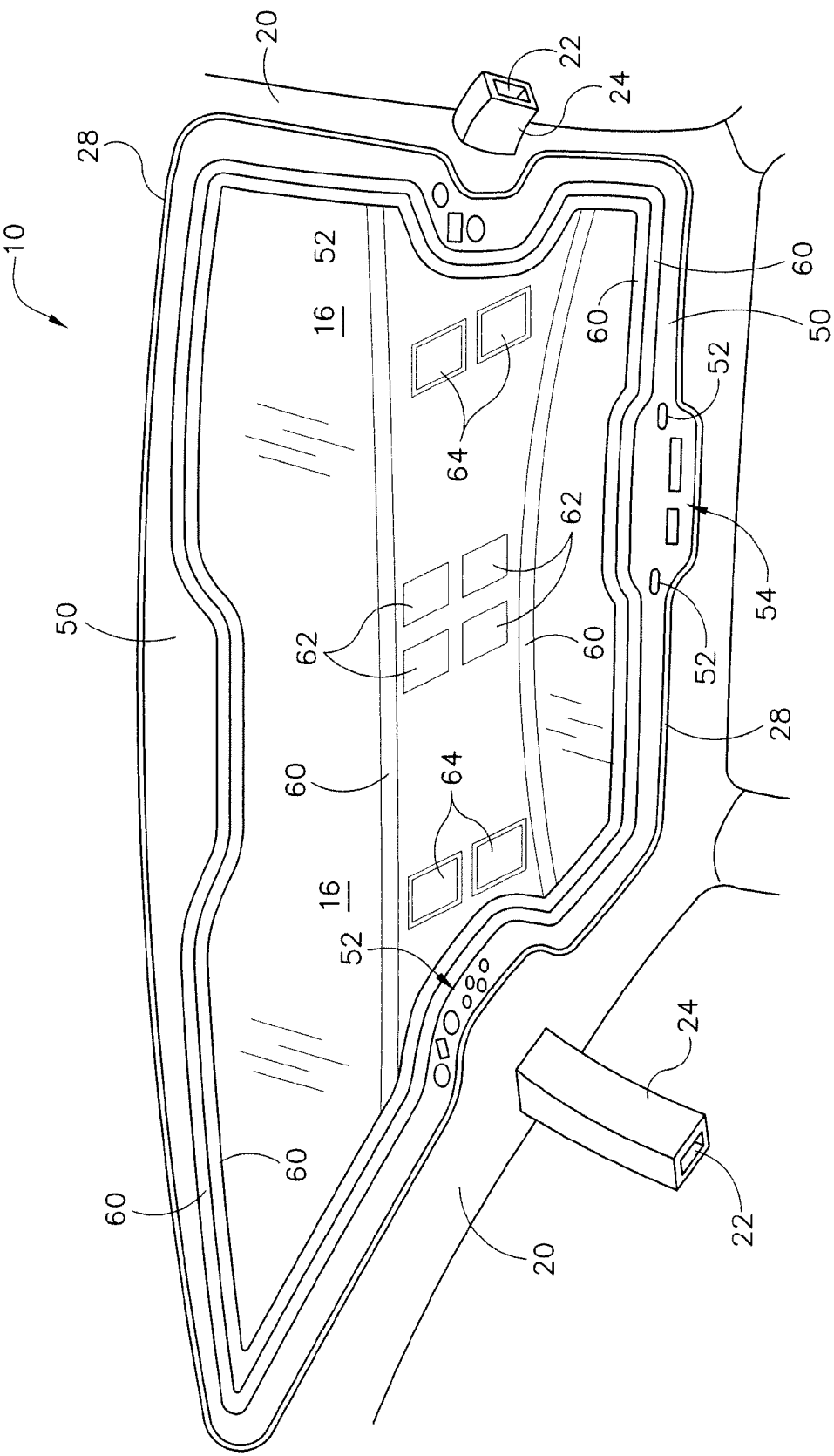
FIG. 4B is a schematic illustration of a roof system having another console with a lighting and media display section integrated with a translucent display panel according to an exemplary embodiment.

Referring to FIGS. 4A and 4B, an alternative embodiment of the roof panels are shown to include a "console" section 70 (which may be "hidden" or exposed) and located at any suitable location on the roof panels. According to the illustrated embodiment of FIGS. 4A and 4B, the console 70 is shown for example as a centrally located console (shown as longitudinally extending in FIG. 4A and laterally extending in FIG. 4B). The console may be used in any suitable roof system application, but is also intended for use in vehicles having a structural crossbow, beam or other support member, where the console is located to correspond with the structural support location. The console may include lights 62 (such as low profile, high-intensity LED task lights, etc.) or any of a wide variety of media display devices 64, such as, but not limited to, song listings from digital music devices that interface with the vehicle information or entertainment system, telephone listings stored in a user's mobile telephone that interfaces with the vehicles communication system, navigational information provided by "permanent" or hand-held GPS devices, vehicle diagnostic or operating data provided by the vehicle's onboard computer system, etc. The displays 64 may be provided by any suitable thin-layer device (e.g. LCD, OLED, etc.) provided in or behind the surface of the panel, and are preferably "hidden" from ordinary view by a translucent (e.g. "smoky", tinted, frosted, reflective, etc.) section of the panel. The portion of the panel overlaying the light 62 or display 64 may be shaped in the form of a lens or other suitable image-enhancing structure to direct the light to an intended location or enhance the readability of a display panel 64. The console 70 may be "bordered" or accented by ambient lighting bands 66, of a type as previously described. The lighting device 62 in the console 70 may also interface with the vehicle's warning or notification system to help alert a driver to an event detected by the vehicle's computer system (e.g. rain, freezing temperatures, abnormal vehicle operating condition, approaching hazards, etc.).

Referring to FIGS. 5 and 6, the roof system 10 is shown according to another exemplary embodiment. The roof system 10 includes a console 70 coupled to a vehicle headliner or perimeter trim member 20 of the vehicle roof system 10. According to the embodiment illustrated, the console 70 is shown for example as a centrally located console extending in a substantially lateral direction relative to the direction of the vehicle. According to the various alternative embodiments, the console 70 may extend in a longitudinal direction. The console 70 is shown as supporting a first image display device (e.g., entertainment device, vehicle component, DVD player, etc.), shown as a first video display 72 and a second image display device, shown as a second video display 74.

The first video display 72 and the second video display 74 are configured to be selectively moved between a first or use position, wherein a display screen of the respective video display is at least partially visible to a user, and a second or stowed position, wherein the display screen is substantially concealed or hidden from the user. In the stowed position, the first video display 72 and the second video display 74 are received by a recess or depression in the console 70 so that the video displays can nest with the console 70 and provide for a substantially continuous console when stowed. According to the embodiment illustrated, the first video display 72 and the second video display 74 are moved between the use position and the stowed position by being rotated about a hinge that couples the respective video display to the console 70. According to an exemplary embodiment, movement of the first video display 72 between the use position and the stowed position is independent of movement of the second video display 74 between the use position and the stowed position (i.e., one video display may remain stowed while the other video display is being used).

The console 70 is further shown as supporting a user interface or controls (e.g., volume controls, action controls (e.g., channel or station selection, play, stop, pause, etc.), display controls (e.g., brightness, contrast, color, etc.), etc.) associated with each video display. For example, the console 70 is shown as supporting a first set of controls 76 associated with the first video display 72 and a second set of controls 78 associated with the second video display 74. According to an exemplary embodiment, the first set of controls 76 and the second set of controls 78 are touch-activated switches (e.g., capacitive switches, etc.) configured to be visible to a user when the first video display 72 and the second video display 74 respectively are in the use position and hidden from the user when the first video display 72 and the second video display 74 respectively are in the stowed position.

According to the embodiment illustrated, the first set of controls 76 and the second set of controls 78 are made visible to a user by being illuminated by a light source (e.g., backlight, etc.) and are hidden from a user by having the light source turned off or decreased. According to an exemplary embodiment, the light source is controlled by the movement of the first video display 72 and the second video display 74. For example, when user starts to move the first video display 72 from the stowed position to the use position, movement of the first video display 72 triggers a switch that activates the light source for illuminating the first set of controls 76. Similarly, when a user moves the first video display 72 from the use position to the stowed position, movement of the first video display 72 into the stowed position triggers a switch that turns off or decreases the intensity of the light source so that the first set of controls 76 are substantially hidden from the user. Such a configuration is illustrated in FIG. 6. Specifically, the first video display 72 is shown in the stowed position and the second video display 74 is shown in the use position. As such, the first set of controls 76 associated with the first video display 72 are hidden from the user, while the second set of controls 78 associated with the second video display 74 are visible to the user.

According to an exemplary embodiment, one or more portions of the first set of controls 76 and/or the second set of controls 78 may remain illuminated when the first video display 72 and the second video display 74 respectively are moved into the stowed position. For example, a portion may remain illuminated that is intended to direct a user to where the user should touch or otherwise engage the video display for moving it between the to stowed and use positions. Such a portion of the controls may remain illuminated at all times or may be illuminated only when the ambient light within the vehicle cabin is at a level where it may be helpful to provide illuminated guidance for the user (e.g., such a function may be coupled to other systems of vehicle, such as, a switch used to trigger a vehicle's headlights, etc.).

According to an exemplary embodiment, the console 70 utilizes a reflective film on or embedded in the console 70 for illuminating the first set of controls 76 and the second set of controls 78. The reflective film illuminates upon being exposed to a light source (e.g., backlight, etc.). The light source is hidden and is transmitted to an end use (sensor, controls, ambient light) by light tubes or fiber optics embedded in the glass structure and/or in the perimeter trim member 20. Illuminated reflective film is similar to electroluminescence, however, shining a linear light source onto a surface is less costly than the electroluminescence method. According to an exemplary embodiment, the embedded fiber optics may be included in the glass laminate forming the vehicle roof and may be used for ambient or task lighting controls. Complementary and control circuitry can also be embedded in the glass laminates and coupled to the lights and film for various lighting functions.

According to the various alternative embodiments, the console 70 may be used to support any of a variety of devices including, but not limited to, lights (such as low profile, high-intensity LED task lights, etc.), any of a wide variety of display or media devices, such as, but not limited to, a DVD player, an MP3 player, iPod®, TiVo®, satellite receiver, PhatNoise® module, telephone, portable computing device, personal data assistant (PDA), GPS device, etc. and/or controls or modules associated with other vehicle systems (e.g., HVAC, seats, windows, an audio system, etc.), etc. The actuation of any of these devices between a stowed position and a use position, or any other positions, may be used to illuminate a user interface or control associated with such devices. According to the various alternative embodiments, a user interface or control associated with devices supported by the roof assembly may be illuminated when a user's hand, or any other object, gets close to the device rather than waiting for a user to begin to move the device (e.g., a motion or proximity sensor may be used to detect the user, etc.). According to further alternative embodiments, at least a portion of the user interface or controls associated with the devices supported by the roof system may be disposed on the substantially transparent panel or glass laminate of the roof assembly.

Figure 7:
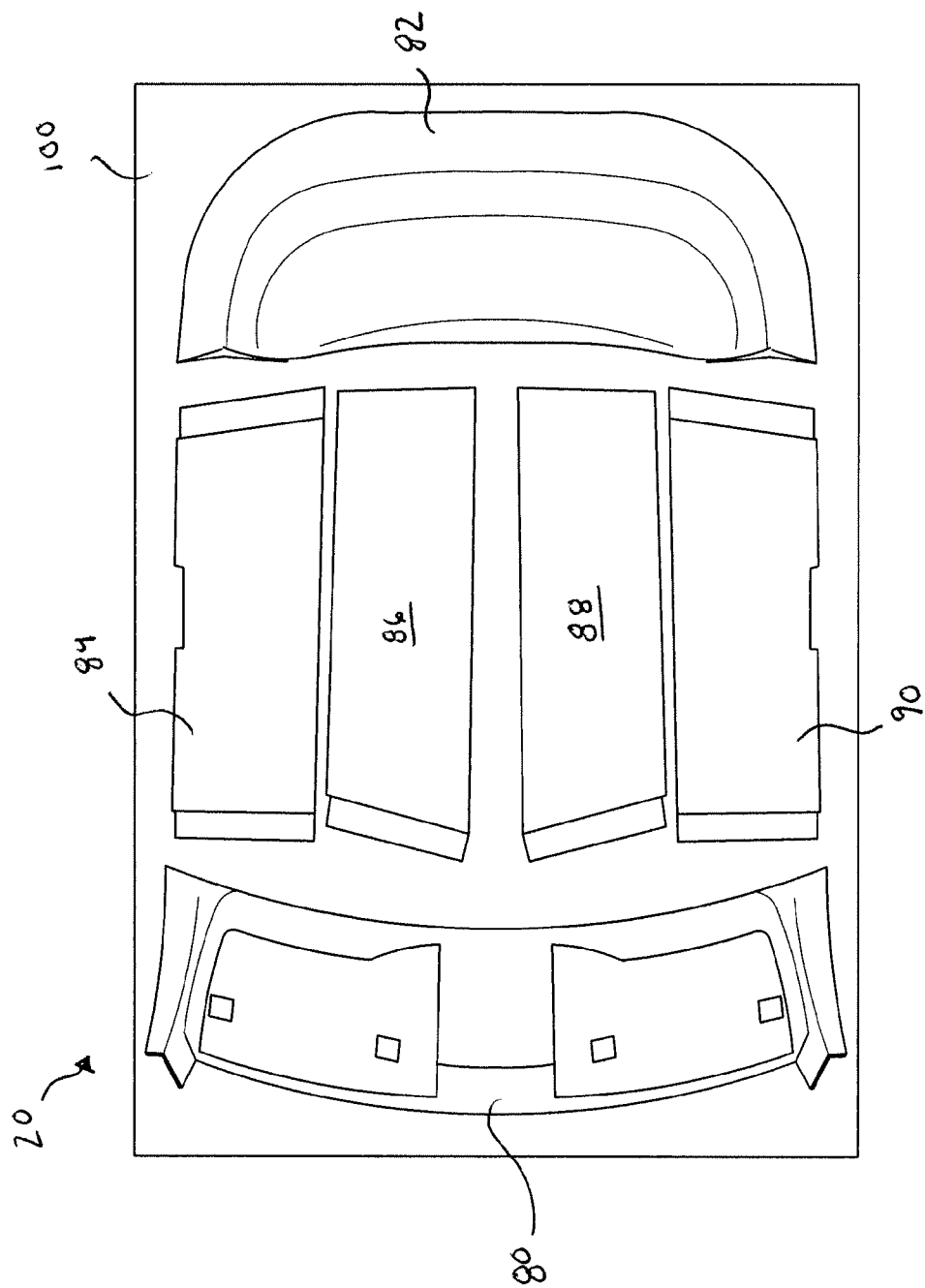
FIG. 7 is a schematic illustration of a top view of a perimeter trim member for a roof system according to an exemplary embodiment after being formed by a molding process.
Figure 8:
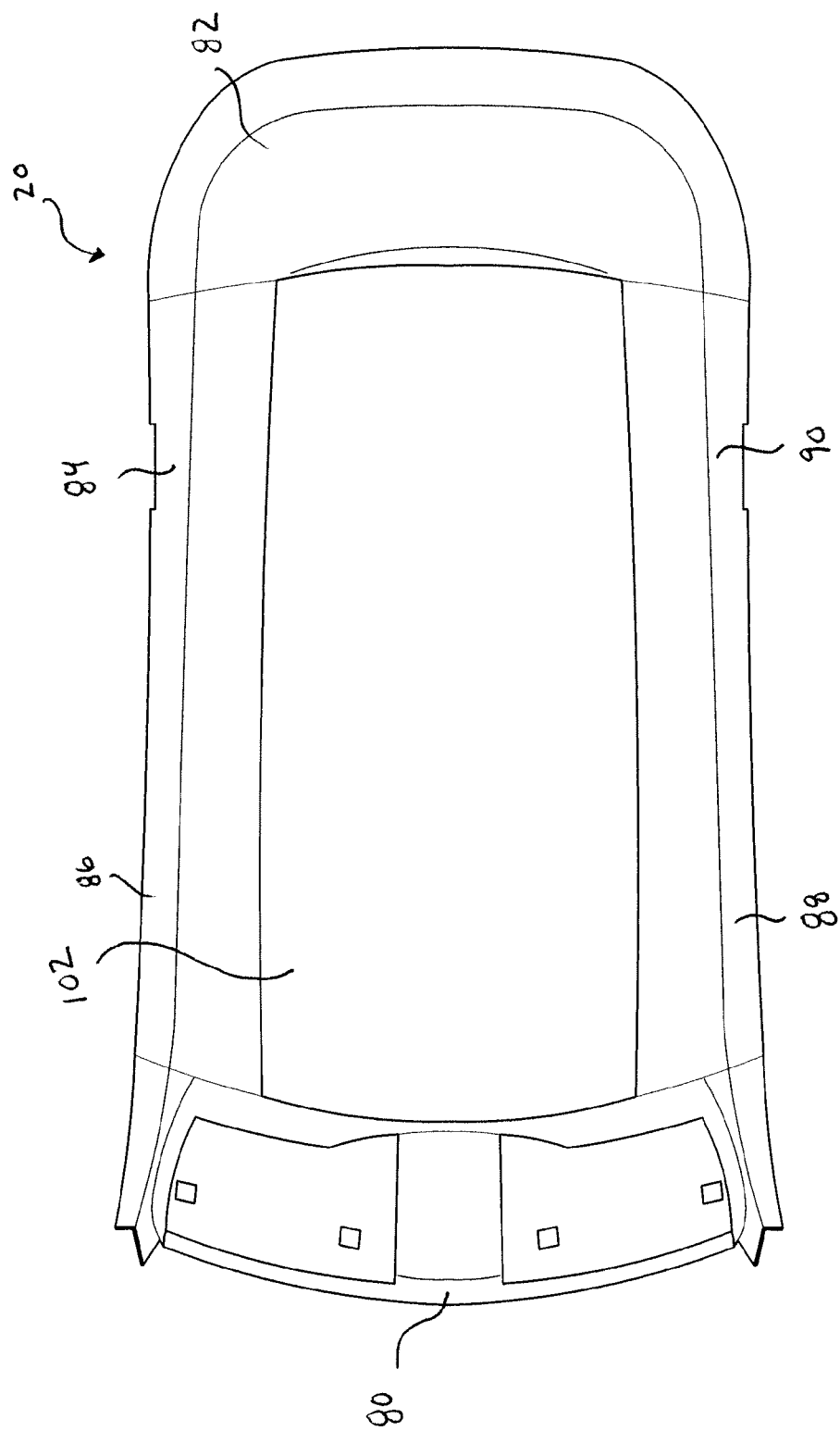
FIG. 8 is a schematic illustration of a top view of the perimeter trim member of FIG. 7 shown after being assembled.

Referring now to FIGS. 7 and 8, the perimeter trim member 20 of the roof system 10 for a vehicle is shown according to an exemplary embodiment. The perimeter trim member 20 is manufactured by a molding process such as thermoforming, injection molding, blow molding or other appropriate molding process. The perimeter trim member 20 is formed as several individual components or sections that are assembled together after the molding process to provide a single perimeter trim member 20. According to the embodiment illustrated, all of the individual components or sections of the perimeter trim member 20 are molded as a single sheet and then separated after molding. Such a configuration is intended to improve efficiency and/or reduce the amount of scrap or waste material.

Figure 9:
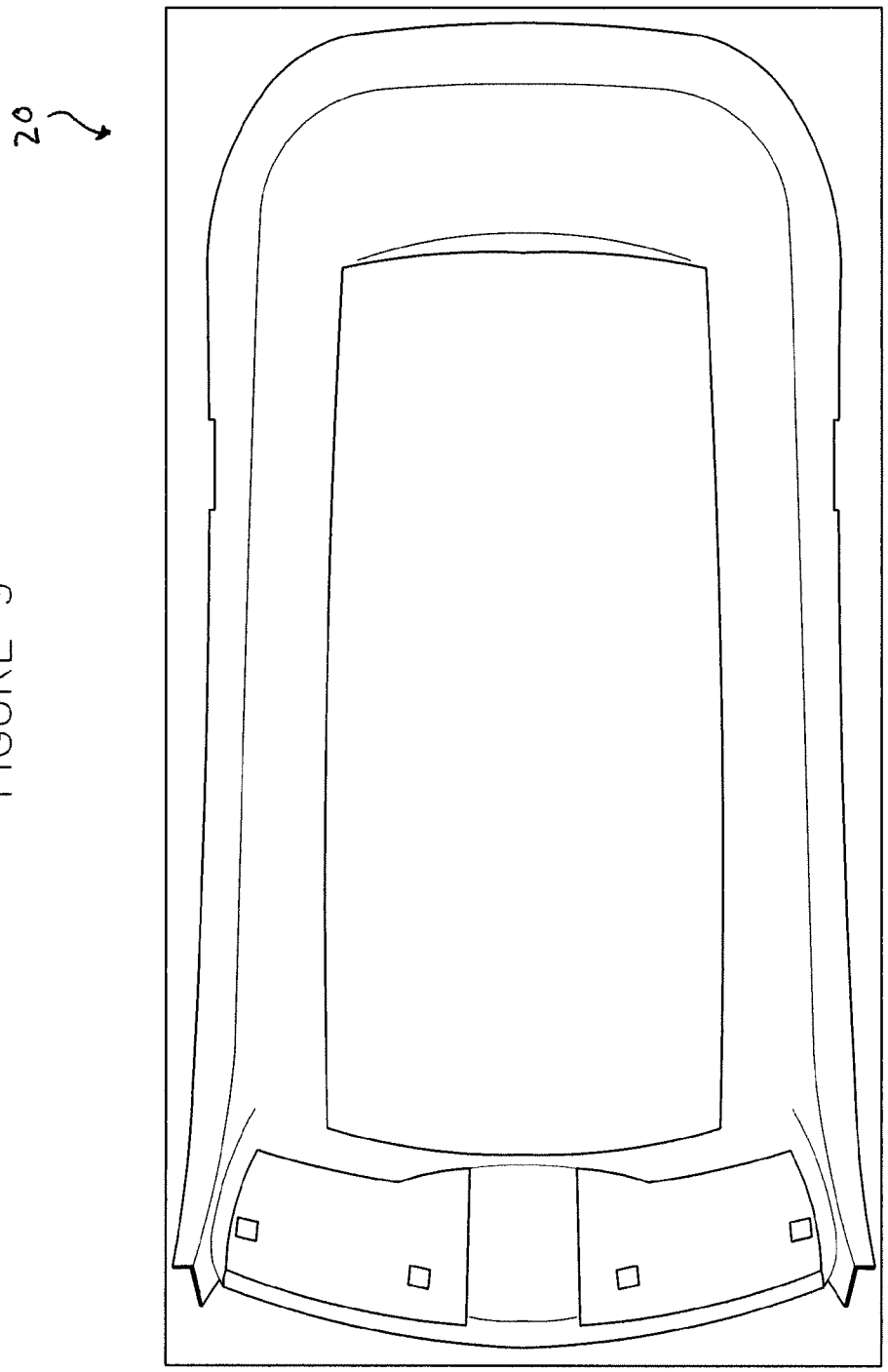
FIG. 9 is a schematic illustration of a top view of a perimeter trim member for a roof system according to another exemplary embodiment after being formed by a molding process.
Figure 10:
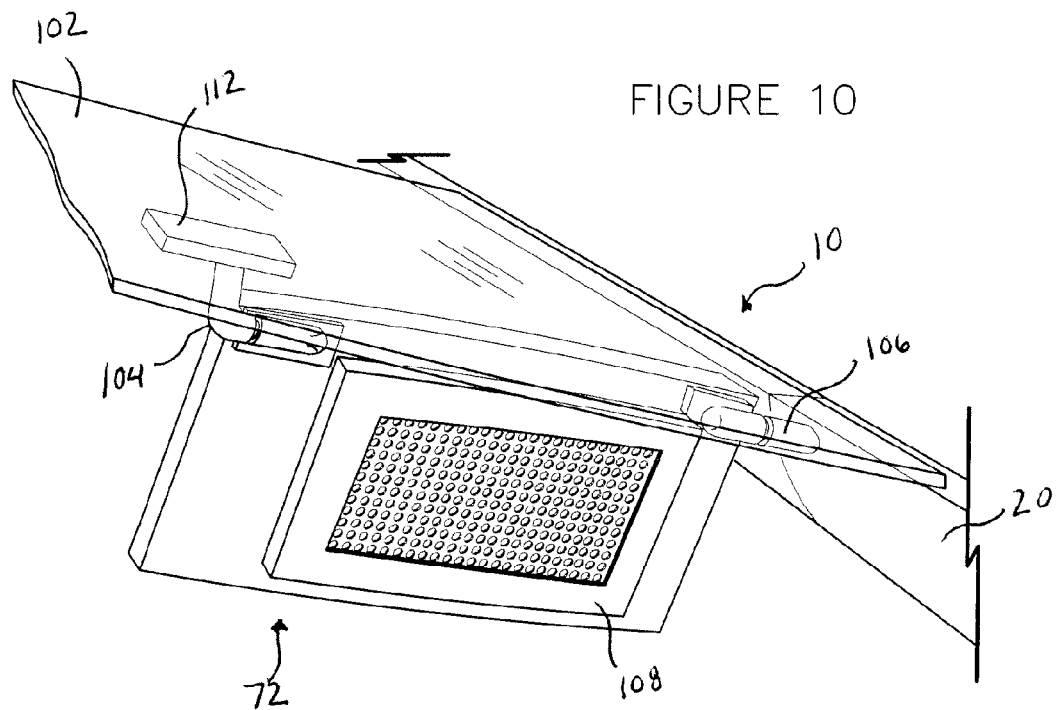
FIG. 10 is a schematic illustration of a rear perspective view of a component at least partially mounted to a roof system according to an exemplary embodiment.
Figure 11:
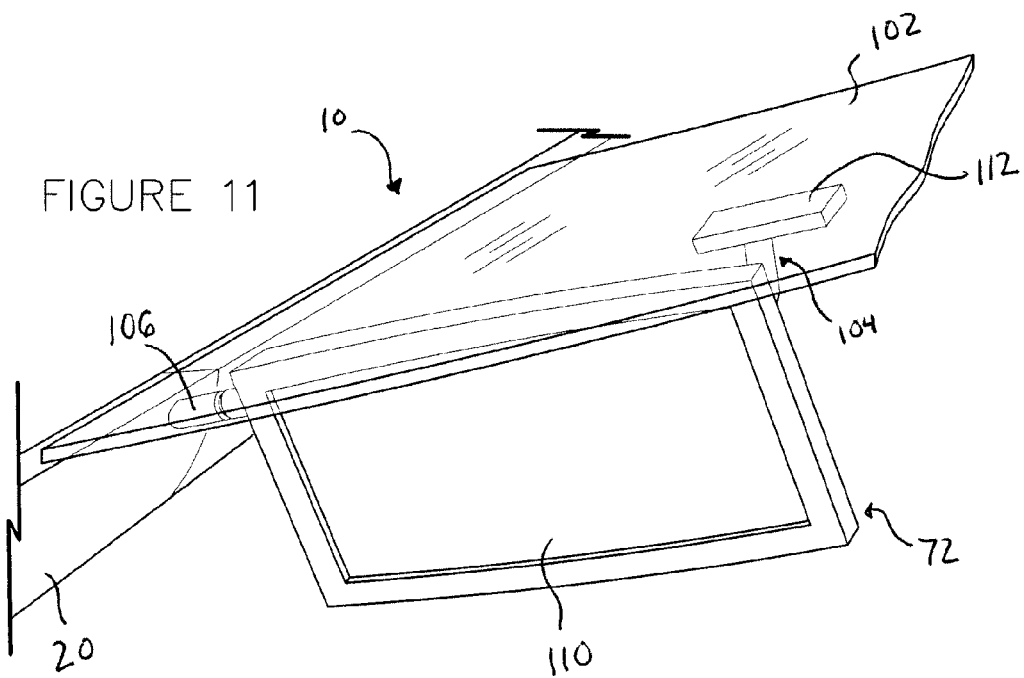
FIG. 11 is a schematic illustration of a front perspective view of the component of FIG. 10 at least partially mounted to the roof system.
Figure 12:
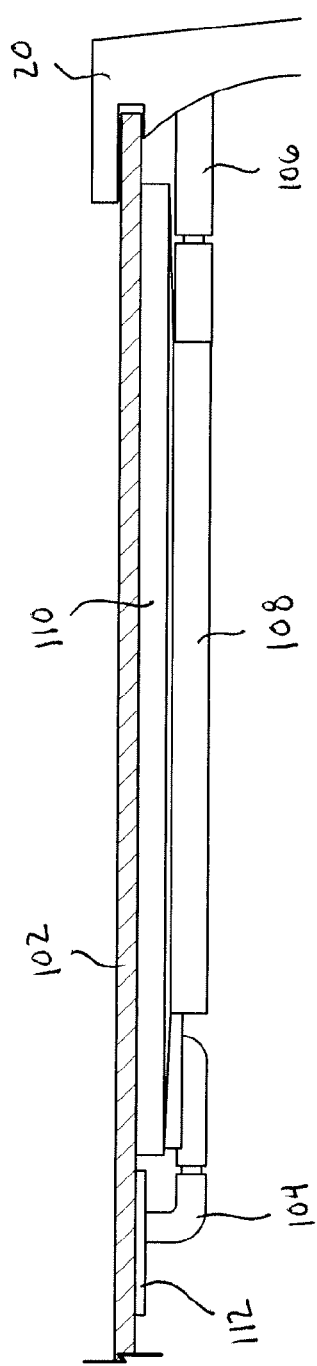
FIG. 12 is a schematic illustration of a front elevation view of the component of FIG. 10 shown in a stowed position.
Figure 13:
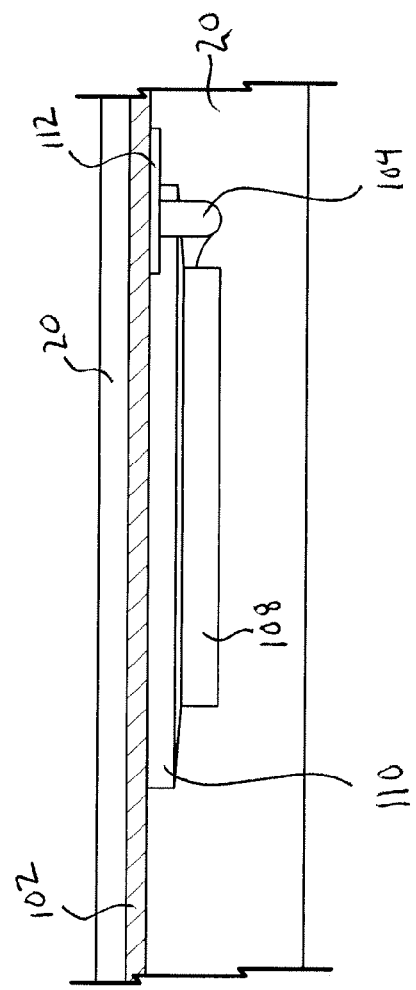
FIG. 13 is a schematic illustration of a side elevation view of the component of FIG. 10 shown in the stowed position.

Referring to FIG. 7 in particular, the perimeter trim member 20 includes a first or front section 80, a second or rear section 82, a third or driver side rear lateral section 84, a fourth or driver side front lateral section 86, a fifth or passenger side front lateral section 88 and a sixth or passenger side rear lateral section 90. The various sections of the perimeter trim member 20 are arranged or nested so that they can all be formed on a single sheet 100 of material. According to the embodiment illustrated, sheet 100 is a substantially rectangular sheet, with the front section 80 and the rear section 82 provided at opposite ends and arranged to extend laterally across the sheet 100. The remaining sections (i.e., the driver side rear lateral section 84, the driver side front lateral section 86, the passenger side rear lateral section 88 and the passenger side front lateral section 90) are provided between the front section 80 and the rear section 82 and extend substantially perpendicular thereto. Arranging the sections of the perimeter trim member 20 in this manner is intended to reduce the amount of scrap or waste material by approximately fifty percent in comparison to if the perimeter trim member 20 was molded as a single member (see FIG. 9).

According to the various alternative embodiments, the front section 80, the rear section 82, the driver side rear lateral section 84, the driver side front lateral section 86, the passenger side rear lateral section 88 and the passenger side front lateral section 90 may all be arranged substantially parallel with one another (e.g., by extending substantially laterally or longitudinally across a rectangular sheet 100, etc.).

After the molding process, the various sections of the perimeter trim member 20 are cut out of the sheet 100 and assembled as illustrated in FIG. 8. To assemble the perimeter trim member 20, the various sections are coupled to each other using suitable methods (e.g., adhesives, heat welding, friction fit, snap fit, etc.) or fasteners (e.g., clips, rivets, bolts, etc.) to provide an aesthetically pleasing headliner or perimeter trim also referred to as a "picture frame." According to an exemplary embodiment, once the perimeter trim member 20 is assembled, it is coupled to a glass laminate assembly. With the perimeter trim member 20 coupled to the glass laminate assembly, the perimeter trim member 20 is configured to conceal the various electronic and lighting wiring and optical fibers and control circuitry. In addition, the perimeter trim assembly 20 may support various controls and/or may provide access to controls and/or sensors provided at the glass laminate assembly. The perimeter trim member 20 can also be configured to include storage space and integrated air bags.

Referring now to FIGS. 10 through 13, the roof system 10 is shown according to another exemplary embodiment. The roof system 10 includes a perimeter trim member 20 and a glass laminate assembly 102. According to the embodiment illustrated, the roof system 10 also includes a component (e.g., a media device such as an MP3 player, iPod®, TiVo®, satellite receiver, PhatNoise® module, telephone, portable computing device, personal data assistant (PDA), GPS device, etc.), shown as a first video display 72, that includes a portion that is supported by the glass laminate assembly 102. Controls associated with the first video display 72 may be provided on the first video display 72 itself, the glass laminate assembly 102 (as detailed above with respect to FIGS. 1 through 4B) and/or on the perimeter trim member 20. Such controls may be configured to be hidden from a user's view when the first video display 72 is not in use (e.g., when stowed, etc.) and/or may become visible (e.g., illuminated, etc.) upon movement of the first video display 72 as detailed above with respect to FIGS. 5 and 6. Any electronics (e.g., circuitry, etc.) and/or power needed for the first video display 72 can be routed through the glass laminate assembly 102, on the surface of the glass laminate assembly 102 and/or through the perimeter trim member 20.

According to an exemplary embodiment, the first video display 72 is configured to be selectively moved between a first or use position (shown in FIGS. 10 and 11), wherein a display screen 110 of the first video display 72 is substantially visible to a user, and a second or stowed position (shown in FIGS. 12 and 13), wherein the display screen 110 is substantially concealed from the user. The first video display 72 can be configured to be moved manually between the use and stowed positions and/or may be configured to be moved via an automated system (e.g., using a powered actuator such as an electronic, hydraulic or pneumatic actuator, etc.).

In the use position, the first video display 72 can also function as a visor capable of blocking sunlight passing through the glass laminate assembly 102 from a seat occupant. According to an exemplary embodiment, the first video display 72 may include a darkened cover (e.g., a tinted transparent Plexiglas cover, etc.) provided over the display screen 110 of the first video display 72 so that when the first video display 72 is being used as a video display, ambient light coming through the glass laminate assembly 102 does not substantially impair a user's ability to view an image on the display screen 110.

In the stowed position, the first video display 72 is substantially parallel to the laminate glass assembly 102 in order to reduce the overall size of the stowed component. According to an exemplary embodiment, an airflow support member 108 for a heat sink and/or for a speaker system is provided along a backside of the first video display 72. The profile of the airflow support member 108 is minimized in an effort to reduce the overall size of the stowed component.

According to the embodiment illustrated, the first video display 72 is coupled to the glass laminate assembly 102 at a first support member (e.g., fastener, bracket, etc.), shown as a first hinge assembly 104, and is coupled to the perimeter trim assembly 20 at a second support member, shown as a second hinge assembly 106. According to an exemplary embodiment, the first hinge assembly 104 includes a mounting surface (e.g., base, etc.), shown as a mounting pad 112, that is configured to be directly mounted to the glass laminate assembly 102. The mounting pad 112 is shown as a substantially rectangular member, but according to the various alternative embodiments may be any of a variety of suitable shapes. Extending from the mounting pad 112 is a pivot rod or shaft that is intended to be substantially coaxial with a pivot rod or shaft of the second hinge assembly 106.

According to an exemplary embodiment, an adhesive is provided between the mounting pad 112 and the glass laminate assembly 102 to secure the mounting structure (i.e., mounting pad 112) of the first video display 72 thereto. According to an exemplary embodiment, the adhesion between the mounting pad 112 and the glass laminate assembly 102 is intended to be substantially permanent in nature. According to the various alternative embodiments, the mounting pad 112 may be designed to be detachably secured to the glass laminate assembly 102.

According to the various alternative embodiments, any of a variety of media devices (e.g., MP3 player, iPod®, TiVo®, satellite receiver, PhatNoise® module, telephone, portable computing device, personal data assistant (PDA), GPS device, etc.) or vehicle components (e.g., visors, hooks, straps, control panels, etc.) may be at least partially mounted to the glass laminate assembly 102.

Adhering components to the glass of the roof system 10, with minimal bezel features, will maximize light or view around the components (such as visors, coat hooks, lighting, video displays, and/or other components). Using a commercially available adhesives should be able to provide a strength suitable for the particular OEM specifications (fritted glass, clear, tinted or the like). The components may be completely mounted to the glass or partially attached to the glass (as shown).

Mounting a component at least partially to the glass may allow the component to be easily removed or replaced without removing the mounting device from the glass surface if the component should fail or require replacement. Such a configuration allows for servicing of the component without replacement or removal of the glass panel. For example, if the first video display 72 should require servicing or otherwise needs to be removed, the first video display 72 is configured to be removed from the first hinge assembly 104 and the second hinge assembly 106. This allows the first hinge assembly 104 and the second hinge assembly 104 to remain secured to the vehicle (i.e., to the glass laminate assembly 102 and the perimeter trim member 20 respectively) while the first video display 72 is removed.

As noted above, any electronics (e.g., circuitry, etc.) and/or power needed for the first video display 72 or other component at least partially mounted to the glass laminate assembly 102 can be routed through the glass laminate assembly 102 and/or the perimeter trim member 20. For example, the power and control wiring circuitry may be embedded between two sheets of glass or appropriate clear plastic of the glass laminate assembly 102 and laminated together. Further, one or more user interfaces or controls to the various components within the vehicle may be supported by the glass laminate assembly 102 and configured to be visually appealing for a user (e.g., with bevels of specific design adhered over button, switch, or plug-in access points, etc.). In addition to controls for various components, sensors can also be embedded in the glass laminate assembly 102 of the roof system 10 to trigger selective functions related with the vehicle. For example, lights, auto-glass dimming features or the like can be triggered by appropriate sensors.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature The construction and arrangement of the elements of the roof system as shown in the illustrated and other exemplary embodiments is illustrative only. Although only a few embodiments of the present roof system have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g. materials for formation of the panels, technology for displaying images on the display panel, technology for changing a privacy panel between a transparent condition and an opaque condition, technology for communicating image signals to the display panel, etc.). For example, the perimeter trim, ventilation system, user-interface border and ambient lighting band(s) may be used in any suitable combination with one another, and with the roof panel assembly as shown, or with a single transparent roof panel. By further way of example, elements shown as integrally formed may be constructed of multiple parts or elements, the position of elements may be reversed or otherwise varied, and the nature or number of discrete elements or positions may be altered or varied. It should be noted that the elements and/or assemblies of the roof system may be constructed from any of a wide variety of materials that provide sufficient strength or durability, including any of a wide variety of materials (such as thin film plastic) in any of a wide variety of colors, combinations and suitable materials. Other substitutions, modifications, changes and omissions may be made in the design, operating conditions and arrangement of the preferred and other exemplary embodiments.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments.

What is claimed is:

1. A roof assembly for a vehicle, comprising:
   a display device supported at the roof assembly and selectively movable between a use position and a stowed position;
   a user interface associated with the display device,
      wherein the user interface comprises a capacitive switch;
   a light source supported at the roof assembly that is configured to illuminate the user interface;
   a light switch for activating the light source, wherein the light switch is configured to be triggered by movement of the display device from the stowed position,
   a panel assembly including a transparent roof panel;
   a perimeter trim member substantially surrounding the panel assembly; and
   a console supported at an interior of the perimeter trim member and extending across a transparent region of the transparent roof panel to visually separate the transparent region into at least two transparent portions,
      wherein the at least two transparent portions are visible to a user while the display device is in the use position and the stowed position.

2. The roof assembly of claim 1 wherein the display device is at least partially mounted on an inner transparent surface of the transparent roof panel.

3. The roof assembly of claim 1 wherein the display device is supported at the console.

4. The roof assembly of claim 3 wherein the user interface includes a plurality of switches disposed on a region of the console.

5. The roof assembly of claim 4 wherein the plurality of switches are activated by at least one of physical touch and field effect switching.

6. The roof assembly of claim 1 wherein the display device is configured to be rotated when moving between the use position and the stowed position.

7. The roof assembly of claim 1 wherein the light switch activates the light source when the display device reaches the use position.

8. The roof assembly of claim 1 wherein the display device includes a first video display and the user interface includes a first set of controls associated with functions of the first video display.

9. The roof assembly of claim 8 wherein the display device also includes a second video display and a second set of controls associated with functions of the second video display.

10. The roof assembly of claim 9 wherein the first set of controls and the second set of controls are configured to be illuminated independent of each other and dependent upon the position of the first video display and the second video display respectively.

11. The roof assembly of claim 1 wherein the user interface is substantially hidden from a user's view when not illuminated by the light source.

12. A roof assembly for a vehicle, comprising:
    a panel assembly including a transparent roof panel, having a transparent region with a surface configured to face an interior of the vehicle and be visible to a user;
    a perimeter trim member substantially surrounding the panel assembly;
    a vehicle component supported by the perimeter trim member via a first hinge assembly and by the surface of the transparent region of the transparent roof panel via a second hinge assembly,
       wherein the vehicle component has an inwardly extending end that extends inward relative to a perimeter of the transparent region of the transparent roof panel and along the surface of the transparent region;
       wherein the second hinge assembly includes a mounting surface mounted on the surface of the transparent region of the transparent roof panel adjacent to the inwardly extending end for at least partially supporting the vehicle component,
       wherein the mounting surface is mounted on the surface of the transparent region of the transparent roof panel at a location inward of the perimeter trim member with a portion of the transparent region of the transparent roof panel between the mounting surface and the perimeter trim member being visible to the user; and
    an adhesive disposed between the mounting surface and the surface of the transparent region of the transparent roof panel for securing the mounting surface to the surface of the transparent region of the transparent roof panel.

13. The roof assembly of claim 12 wherein the vehicle component is a display device movable between a use position and a stowed position and wherein the display device is usable as a visor in the use position.

14. The roof assembly of claim 13 further comprising a user interface associated with the display device and a light source configured to illuminate the user interface.

15. The roof assembly of claim 13 wherein the display device is supported by the surface of the transparent region of the transparent roof panel at a first end of the display device and is supported at the perimeter trim member at a second end of the display device.

16. The roof assembly of claim 15 wherein the first hinge assembly supports the display device at the perimeter trim member and wherein the display device is selectively removable from the first hinge assembly and the second hinge assembly while the first hinge assembly and the second hinge assembly remain secured to the roof assembly.

17. A method of manufacturing a perimeter trim member for a vehicle roof system for a vehicle, comprising:
   designing the perimeter trim member for the vehicle roof system as a plurality of sections;
   molding the plurality of sections as a single sheet of material;
   separating the plurality of sections from the single sheet; and
   assembling the plurality of sections to form the perimeter trim member for the vehicle roof system,
   wherein the perimeter trim member is configured to be coupled to a vehicle roof system.

18. The method of claim 17 wherein the plurality of sections includes a front section, a rear section, a first side section and a second side section.

19. The method of claim 18 wherein the first side section and the second side section are molded at an orientation that is substantially perpendicular to the front section and the rear section.

20. The method of claim 17 wherein separating the plurality of sections from the single sheet includes cutting the plurality of sections out of the sheet material.

21. The method of claim 17 wherein the sheet material is a substantially rectangular member.

* * * * *